United States Patent [19]

Shiho

[11] Patent Number: 4,849,952
[45] Date of Patent: Jul. 18, 1989

[54] MAGNETOOPTICAL INFORMATION RECORDING APPARATUS HAVING INTENSIFIED MAGNETIC FLUX APPLYING MEANS

[75] Inventor: Makoto Shiho, Yokohama, Japan
[73] Assignee: Canon Kabushiki Kaisha, Tokyo, Japan
[21] Appl. No.: 907,749
[22] Filed: Sep. 16, 1986

[30] Foreign Application Priority Data

Sep. 18, 1985 [JP] Japan ................ 60-204531
Aug. 27, 1986 [JP] Japan ................ 61-200533

[51] Int. Cl.$^4$ .................. G11B 11/14; G11B 13/04
[52] U.S. Cl. ............................... 369/13; 360/59; 360/114; 365/122
[58] Field of Search ............ 369/13; 360/114, 59, 360/118, 60, 121; 365/122

[56] References Cited

U.S. PATENT DOCUMENTS

| 1,866,631 | 7/1932 | Dorff et al. | 365/122 |
| 2,984,825 | 5/1961 | Fuller et al. | 365/122 |
| 4,382,269 | 5/1983 | Kato | 360/121 |
| 4,622,614 | 11/1986 | Yamashita et al. | 360/121 |

FOREIGN PATENT DOCUMENTS

| 57-94906 | 6/1982 | Japan | 369/13 |
| 59-119507 | 7/1984 | Japan | 360/114 |
| 60-147950 | 8/1985 | Japan | 360/114 |
| 61-148687 | 7/1986 | Japan | 369/13 |
| 2083677 | 3/1982 | United Kingdom | 369/13 |

OTHER PUBLICATIONS

Schneider et al., the IBM Tech. Dis. Bulletin, vol. 19, No. 4, Sep. 1976, pp. 1296–1297.

*Primary Examiner*—Alan Faber
*Assistant Examiner*—Hoa T. Nguyen
*Attorney, Agent, or Firm*—Fitzpatrick, Cella, Harper & Scinto

[57] ABSTRACT

A magnetooptical information recording apparatus is provided with a device for irradiating a magnetooptical recording medium with a light beam, and a device for applying a bias magnetic field to a portion, irradiated by the light beam, of the magnetooptical recording medium. The applying device is provided with a yoke member having a first projecting portion positioned in the vicinity of the irradiated portion and a second projecting portion spaced from the first projecting portion in a direction along the surface of the recording medium, wherein the distance of the second projecting portion from the first projecting portion at a closer side to the recording medium is smaller than that at a farther side to the recording medium.

3 Claims, 2 Drawing Sheets

MAGNETOOPTICAL INFORMATION RECORDING APPARATUS HAVING INTENSIFIED MAGNETIC FLUX APPLYING MEANS

BACKGROUND OF THE INVENTION

1. Field of the Invention

The present invention relates to a magnetooptical information recording apparatus in which a magnetooptical recording medium is irradiated with a light beam and a bias magnetic field is applied to the thus irradiated portion thereby recording information on said medium or erasing information recorded on said medium, and in particular such apparatus employing an electromagnet as the means for applying said bias magnetic field.

2. Related Background Art

The magnetooptical information recording apparatus has been the target of active development works in recent years as an erasable-rewritable memory of large capacity. The magnetooptical recording mediums employable in such apparatus are mostly disk-shaped ones, or magnetooptical disks. The magnetooptical disk is composed of a vertically magnetizable layer formed on a substrate such as glass or plastic, and said vertically magnetizable layer is magnetized in one direction. For recording information, the vertically magnetizable layer is irradiated with a laser beam digitally modulated according to an information signal, thus bringing the temperature of said layer beyond the Curie point thereof. Thus, a portion irradiated with the laser beam loses magnetization, and is magnetized again, when it is cooled, in a direction opposite to the direction of magnetization in the surrounding areas, by means of an externally applied DC bias magnetic field. In this manner a train of information pits is obtained corresponding to the information.

For reading the information recorded on the magnetooptical disk, the vertically magnetizable layer is irradiated with a reading laser beam, and the reading is achieved by means of magnetic Kerr effect, or a phenomenon that the direction of polarization of the reflected beam is varied according to the magnetizing direction of the vertically magnetizable layer. On the other hand, a train of recording pits can be erased by tracking and irradiating said pits with a laser beam and applying a DC bias magnetic field of a direction opposite to the magnetizing direction of pits, thereby rendering the direction of magnetization of said layer uniform again.

The direction of said DC bias magnetic field in erasing has naturally to be opposite to that in recording. In general, a DC bias magnetic field can be generated by a permanent magnet or an electromagnet, but the use of the latter is common since the former requires a specific mechanism and a time for inverting the magnetic field.

FIG. 1 is a perspective view of a conventional magnetooptical information recording apparatus utilizing an electromagnet.

In FIG. 1, bias magnetic field applying means 21 is composed of a main yoke 22, side yokes 23, 24 positioned on both sides thereof, a yoke plate 26 connecting an end of the main yoke 22 and the side yokes 23, 24, and a coil 25 wound on the main yoke 22. The main yoke 22 is T-shaped in order to facilitate coil winding.

Said bias magnetic field applying means 21 is positioned opposite to an optical head 27 across a magnetooptical disk 28, and in such a manner that the longitudinal direction of the main yoke 22 lies in the radial direction of the magnetooptical disk 28. The optical head 27 is provided with a light source such as a semiconductor laser, an objective lens for converging the light from said light source onto the magnetooptical disk 28 etc., and is rendered movable, by an unrepresented mechanism, in the radial direction of the magnetooptical disk.

However, in the above-explained structure, the magnetic flux from the main yoke 22 enters the side yokes 23, 24 through the air, so that only a small portion of said magnetic flux can be concentrated on the information recording portion of the magnetooptical disk 28. Consequently, in order to obtain a magnetic field of a desired intensity, it has been necessary to employ a very strong current or a coil of several hundred turns.

Such strong current requires a large and, expensive power source, and results in an nonnegligible rise in temperature. On the other hand, an increased number of turns of the coil inevitably increases the dimension of the magnetic field applying device, and gives rise to a proportionally increased reactance of the coil, thus requiring a longer switching time from information recording to erasing or vice versa.

SUMMARY OF THE INVENTION

In consideration of the foregoing, the object of the present invention is to provide a magnetooptical information recording apparatus capable of concentrating the flux of bias magnetic field to the recording portion of the magnetooptical recording medium, thereby achieving efficient information recording or erasure.

The foregoing object can be achieved according to the present invention, in a magnetooptical information recording apparatus provided with means for irradiating the magnetooptical information recording medium with a light beam and bias magnetic field applying means including a yoke provided with a first projecting portion positioned in the vicinity of the portion irradiated b said light beam and a second projecting portion spaced from said first projecting portion in a direction along the surface of said recording medium, by a structure in which the distance of the second protruding portion of said yoke from the first protruding portion at a closer side to said medium is smaller than that at a farther side to said medium.

DETAILED DESCRIPTION OF THE PREFERRED EMBODIMENTS

Now the present invention will be clarified in detail by an embodiment thereof shown in the attached drawings.

Figure 1:
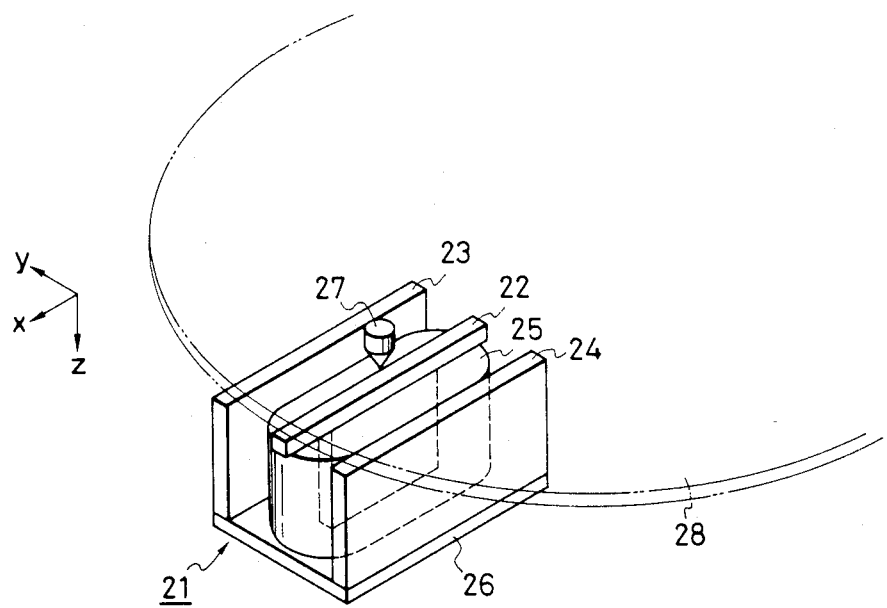
FIG. 1 is a schematic perspective view of a conventional magnetooptical information recording apparatus.
Figure 2:
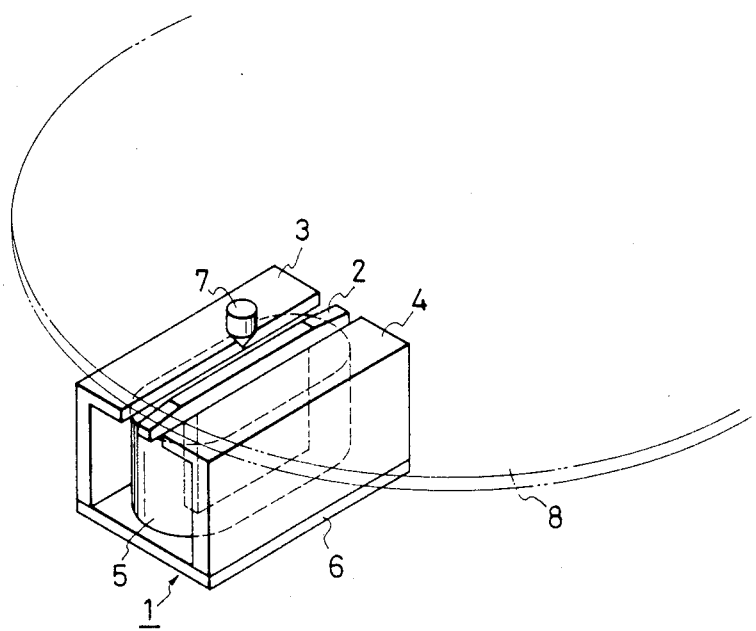
FIG. 2 is a schematic perspective view of a magnetooptical information recording apparatus embodying the present invention.

FIG. 2 is a schematic perspective view of a magnetooptical information recording apparatus embodying the present invention, wherein bias magnetic field applying means 1 is composed of a main yoke 2, side yokes 3, 4 positioned on both sides thereof, a yoke plate 6 connecting the ends of the main yoke 2 and side yokes 3, 4, and a coil wound on the main yoke 2. Said bias magnetic field applying means 1 is positioned opposite an optical head 7, across a magnetooptical disk 8, for irradiating said disk with a light beam, and in such a manner that the longitudinal direction of the main yoke 2 coincides with the radial direction of said magnetooptical disk 8. The main yoke 2, side yokes 3, 4 and yoke plate 6 are made of a magnetic, material for example, pure iron such as soft iron, or a ferrous alloy such as Si-Fe or Ni-Fe. The coil 5 is composed of 300–1,000 turns of a copper wire of ca. 0.3–0.6 mm$\phi$ and is fixed with an adhesive material. When a current is supplied to the coil 5, the main yoke 2 generates a DC bias magnetic field in a direction perpendicular to the surface of the magnetooptical disk 8. The main yoke 2 is T-shaped in order to facilitate the winding of the coil 5, while the side yokes 3, 4 are L-shaped with only are leg of the "L" extending toward the main yoke at a side close to the magnetooptical disk.

Figure 3:
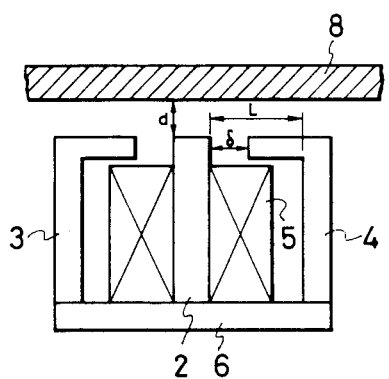
FIG. 3 is a schematic cross-sectional view of the apparatus shown in FIG. 2.
Figure 4:
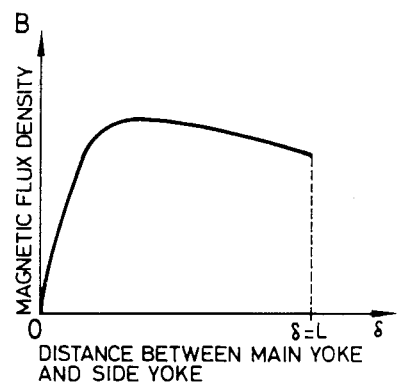
FIGS. 4 to 6 are charts showing the relationship between the distance of the protruding portions and the magnetic flux density at the recording portion of the recording medium.

FIG. 3 is a cross-sectional view of the magnetooptical information recording apparatus shown in FIG. 2, wherein the hatched area indicates the cross-section of the magnetooptical disk 8. FIG. 4 is a chart showing the relationship between 6 in FIG. 3, where 8 is the distance between the main yoke 2 and the side yoke 3 or 4 on the abscissa, and the magnetic flux density B at the position of the light beam spot on the magnetooptical recording medium, represented on the ordinate.

As shown in FIG. 4, when 6 is close to zero, B becomes small since the magnetic flux emerging from the main yoke 2 scarcely reaches the magnetooptical recording medium and enters the side yokes 3, 4. On the other hand, in the conventional structure where $\delta = L$, B becomes again low since the magnetic flux is not concentrated due to an excessively large distance between the main yoke 2 and the side yokes 3,4.

Figure 5:
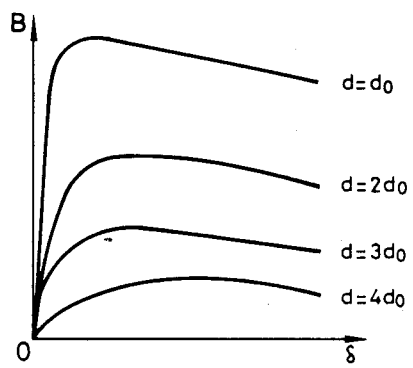
Figure 6:
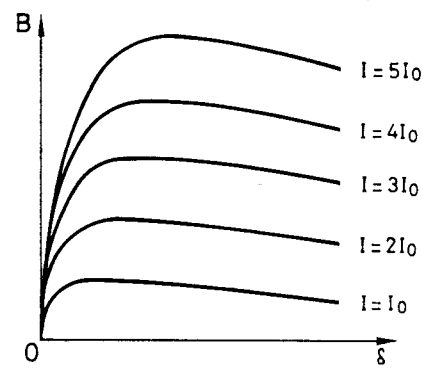
Figure 7:
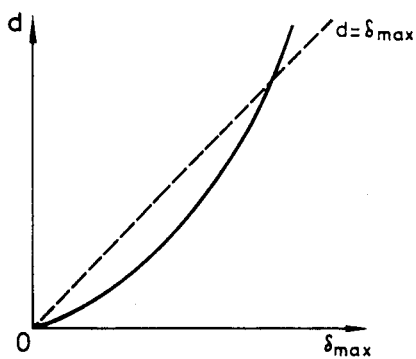
FIG. 7 is a chart showing the relationship between the distance of the protruding portions where a maximum magnetic flux density can be obtained and the distance of the yoke and the recording medium.
Figure 8:
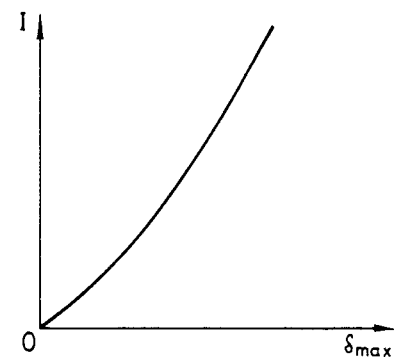
FIG. 8 is a chart showing the relationship between the distance of the protruding portions where a highest magnetic flux density can be obtained and the current in the coil.

A value $\delta_{max}$ giving the maximum magnetic flux density, is variable not only according to the distance d between the main yoke 2 and the magnetooptical recording medium 8 shown in FIG. 3, but also according to the driving current I. FIG. 5 shows the relationship between $\delta$ and B for different values of d, based on a standard value $d_0$. Also, the solid line in FIG. 7 shows the relationship between $\delta_{max}$ and d. For a large value of d, namely at a position distant from the main yoke, the value of $\delta_{max}$ becomes larger because as the leak magnetic flux toward the disk increases, the magnetic flux density perpendicular to the disk also increases FIG. 6 shows the relationship between $\delta$ and B for different values of the coil current I based on a standard value $I_O$. FIG. 8 shows the relationship between $\delta_{max}$ and I. For a large value of I, which gives rise to a larger magnetic flux density and thus a larger leak magnetic flux, a high magnetic flux density on the recording medium can be obtained at a certain large value of $\delta$.

In this manner the value of $\delta_{max}$ is variable according to d and I. On the other hand, the minimum value of the distance d between the bias magnet and the recording medium is determined by the thickness of a transparent layer for protecting the recording medium and the maximum vibration of the disk, and is usually selected in the vicinity of said minimum value in order to improve the efficiency. For example, said distance d is selected in a range of 2 to 3 mm for a thickness of the transparent layer of 1.2 mm and a maximum disk vibration of ca. 0.4 mm.

On the other hand, the value of $\delta_{max}$ should be selected so as to achieve a maximum efficiency for the maximum current, i.e., in the case of generating the erasing magnetic field. This means that the efficiency at recording is somewhat lower because the current I for generating the recording magnetic field is lower than that for generating the erasing magnetic field, but a value of $\delta_{max}$ suitable for the maximum current is preferable because a higher magnetic flux density is required at the information erasure.

The relationship between d and $\delta_{max}$ shown in FIG. 7 corresponds to a general erasing magnetic field, which is in a range of 300 to 500 gauss on the recording medium. Said relationship can be approximated as $\delta_{max} = d$, as shown by the dashed line. Stated differently, in case of generating the erasing magnetic field, a maximum magnetic flux density can be obtained when the distance $\delta$ between the main yoke and the side yoke is approximately equal to the distance d between the bias magnet and the recording medium. However the intensity of the erasing magnetic field may be significantly influenced by the sensitivity of the recording medium, power of the laser, structure of the apparatus etc., and, in consideration of such influence, the value of $\delta$ is preferably selected in a range from 0.5 d to 5 d according to various conditions. The intensity of magnetic field in case of $\delta = 0.5$ d or $\delta = 5$ d is approximately 90% of the maximum intensity of magnetic field obtained in case of $\delta = d$.

On the other hand, a considerably efficient concentration of the magnetic flux onto the magnetooptical recording medium can be assured within the above-mentioned range despite certain variations in the conditions or structure.

The foregoing explanation has been limited to the case of a disk-shaped recording medium, but the present invention is likewise applicable to an apparatus employing a card-shaped magnetooptical recording medium. In general, the structure and dimension of the bias magnetic field applying means are determined according to the shape of the recording medium and the method of access of the optical head to said recording medium, and the form of the main yoke is accordingly variable, since the intensity and distribution of the magnetic field on the recording medium are delicately different for each apparatus. However the structure of the present invention is still applicable for such varied apparatus.

What is claimed is:

1. A magnetooptical information recording apparatus comprising:
   means for irradiating a magnetooptical recording medium with a light beam; and
   means for applying a bias magnetic field to a portion of said magnetooptical recording medium irradiated with said light beam, said means for applying comprising a yoke member having a coil wound thereon and including a first projecting portion adapted to be positioned in the vicinity of said irradiated portion, and a pair of second projecting portions positioned at opposite sides of said first projecting portion in a direction along the surface of said recording medium, wherein the distance between each of said second projecting portions and said first projecting portion at a position close to sad recording medium is smaller than the distance between each of said second projecting portions and said first projecting portion at a position farther from said recording medium.

2. A magnetooptical information recording apparatus according to claim 1, satisfying a relation:

$$0.5d \leqq \delta \leqq 5d$$

wherein d is the distance between the first projecting portion and said magnetooptical recording medium, and $\delta$ is the distance between at least one of said second projecting portions and said first projecting portion at the position close to said recording medium.

3. A magnetooptical information recording apparatus according to claim 2, wherein said distance $\delta$ is equal to the distance d.

* * * * *